3,616,586
PRESSURE VESSELS
Anthony W. T. Mottram, Rugby, England, assignor to Rolls Royce Limited, Derby, England
Filed July 17, 1969, Ser. No. 842,579
Claims priority, application Great Britain, July 17, 1968, 33,975/68
Int. Cl. E04h *7/20;* G21c *13/08*
U.S. Cl. 52—224            7 Claims

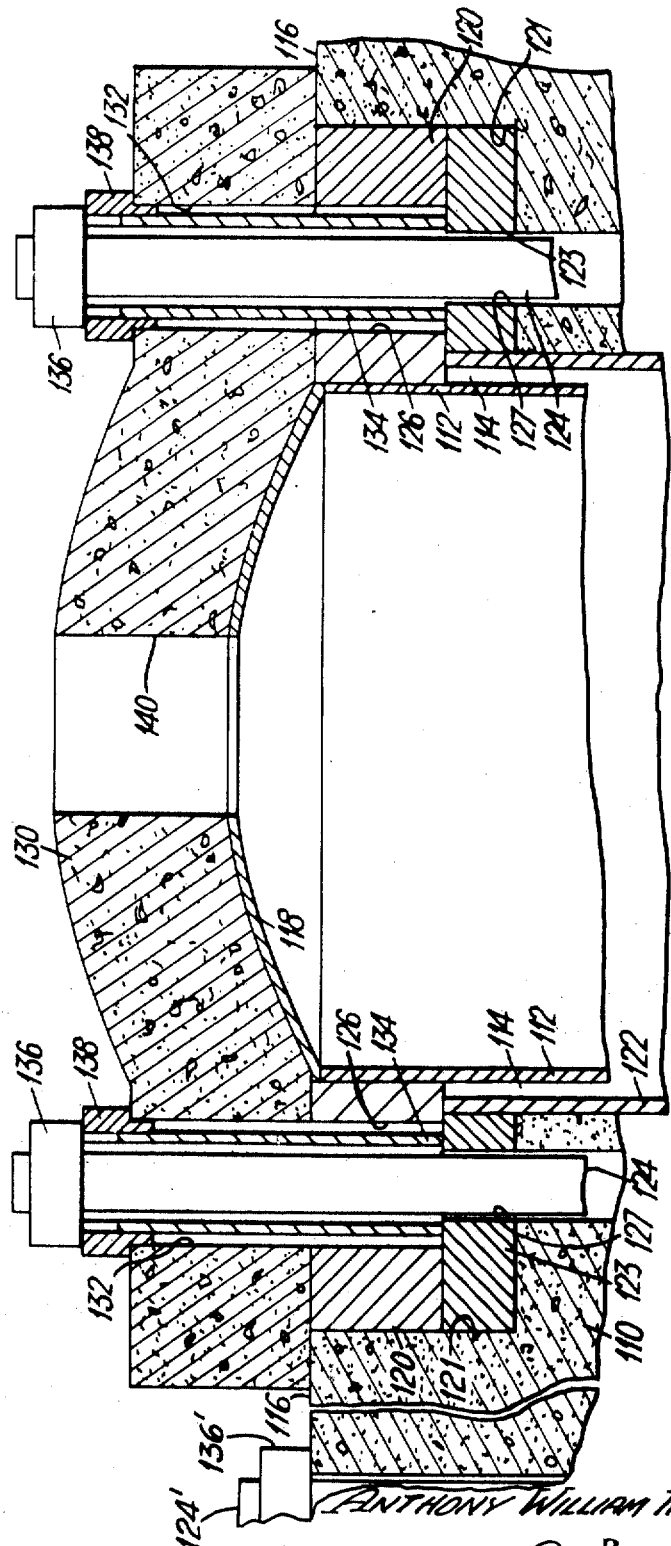

ABSTRACT OF THE DISCLOSURE

A prestressed pressure vessel having an opening in one of its external surfaces to the interior thereof, the vessel being prestressed by a plurality of prestressing cables extending through the material of the vessel substantially perpendicular to the one surface. At least some of the prestressing cables are utilized for maintaining a removable closure member over the opening, there being means for maintaining at least some of the tension in these cables when the closure member is removed so that they still function to prestress the vessel.

---

This invention relates to prestressed pressure vessels and is particularly, but not exclusively, concerned with a prestressed concrete pressure vessel adapted to contain a power plant comprising a nuclear reactor and a closed-cycle gas turbine engine.

When such a power plant is contained in a prestressed concrete pressure vessel, it is desirable that at least the gas turbine engine should be readily removable from the pressure vessel for maintenance purposes. It is necessary, therefore, that the pressure vessel be provided with an opening through which the gas turbine engine may be withdrawn.

It is an object of the present invention to provide a closure member for such an opening, which closure members is removable and does not substantially detract from the integrity of the pressure vessel as a whole when in position.

According to the present invention a prestressed pressure vessel is provided with an opening in one of its external surfaces, a plurality of prestressing cables extending through the material of the pressure vessel in a direction substantially perpendicular to said one surface and a removable closure member adapted to be secured to at least some of the prestressing cables so as to be urged thereby into engagement with the portion of the pressure vessel surrounding the opening.

In a preferred embodiment of the invention, at least some of the prestressing cables are adapted to pass through apertures provided in the closure member, means being provided for securing said at least some of the prestressing cables, while under tension, to the side of closure member remote from the remainder of the pressure vessel.

Preferably there is provided means for transmitting and maintaining at least some tension in said at least some prestressing cables to the remainder of the pressure vessel when said closure member is removed, which means may comprise a plurality of tubular members, one for each of said at least some prestressing cables, each tubular member having one end arranged to abut the portion of the pressure vessel surrounding the opening and being coaxial with its respective prestressing cable, and adapted to extend through a respective one of said apertures, the arrangement being such that said at least some prestressing cables, while still under tension, engage the other ends of their respective tubular members when the closure member is removed.

The material of the pressure vessel may be concrete, while the closure member may be made of prestressed concrete having prestressing cables which extend substantially circumferentially and/or substantially diametrically thereof embedded therein.

The prestressing cables may be made from steel.

The invention will now be particularly described, merely by way of example, with reference to the accompanying drawing, which is a fragmentary diagrammatic vertical sectional view of a prestressed concrete pressure vessel in accordance with the invention.

In the drawing there is shown a prestressed concrete pressure vessel 110 adapted to contain a power plant (not shown) comprising a closed-cycle gas turbine engine having a plurality of heat exchangers in its flow path and a nuclear reactor arranged to heat the working gas of the gas turbine engine prior to its entry into the turbine or turbines of the engine. The gas turbine engine and its associated heat exchangers are contained within a substantially cylindrical pod 112 which is removably mounted in a substantially cylindrical recess 114 provided in the upper surface 16 of the pressure vessel 110. The upper end of the pod 112 is closed by a domed or otherwise suitably shaped steel lid 118 welded to the rim of the pod 112, and is coaxially welded within a hollow flange member 120 located in a shallow circular recess 121 which is coaxial of the recess 114 and defines an upper enlarged end of the recess 114.

The recess 114 is provided with a thin steel liner 122 whose open upper end is welded to the inner circumference of a further flange member 123 located in the recess 121 beneath the flange member 120. Sealing means (not shown) in the form of an O ring is provided between the upper surface of the flange member 123 and the lower surface of the flange member 120.

The pressure vessel 110 is provided with large numbers of steel prestressing cables 124 and 124' only two of the cables 124 and one of the cables 124' are shown on a greatly enlarged scale in the drawing. The cables 124 and 124' pass through tubes (not shown) formed or embedded in the concrete and extend substantially perpendicularly to the surface 116. The cables 124 pass through corresponding holes 126, 127 provided in the flange members 120 and 123 respectively, the holes 126 being of larger diameter than the holes 127. The recess 114 is thus surrounded by angularly spaced apart cables 124 whereas the cables 124' are not necessarily angularly spaced apart but all of the cables 124 and 124' extend in a direction substantially parallel to the axis of recess 114. The cables 124 and 124' are secured by means not shown to the undersurface of the pressure vessel 110.

The recess 114 is provided with a closure member which comprises a thick prestressed concrete lid 130 whose underside is shaped to conform to the steel lid 118 of the pod 112. Ducts (not shown) may be provided in the concrete lid 130 whereby grout may be pumped to the undersurface of the concrete lid 130 so as to fill any spaces between the undersurface and the steel lid 118 due to manufacturing inaccuracies. The grout is prevented from adhering to the adjacent surfaces of the steel lid 118 and the concrete lid 130 by covering the surfaces with polythene sheets (not shown) or a suitable grease.

The concrete lid 130 is prestressed in known manner by steel cables (not shown) which may extend circumferentially and/or diametrically of the concrete lid 130.

The rim of the concrete lid 130 is provided with a series of circumferentially distributed holes 132 which extend parallel to the axis of the recess 114. The holes 132 correspond in number to the holes 126 and the holes 127 in flange members 120 and 123, and when the lid 130 is positioned on the vessel 110, the holes 132, 126 and 127 are co-axial. The holes 132 are of the same diameter as the holes 126 and, thus, are larger than the holes 127. Each of the co-axially aligned holes constituted by the holes 132, 126 contains a steel tube 134 one end of which abuts the upper surface of the flange member 123 coaxially with the respective hole 127 and the other end of which protrudes above the upper surface of the concrete lid 130. The cables 124 immerdiately surrounding the recess 114 pass through the tubes 134, the end of each of the cables 124 above the concrete lid 130 being secured to the upper surface of the concrete lid 130 by a cylindrical fastening member 136 and a split collect 138.

The concrete lid 130 is provided with a central hole 140 through which the power output shaft (not shown) of the power plant may pass, while the ducts (not shown) connected to the heat exchangers of the power plant may either be arranged to pass through further holes (not shown) in the lid 130 having axes substantially parallel to the power output shaft or be bent through 90° within the pod 112 so as to pass through channels (not shown) in the flange member 120.

During assembly of the pressure vessel 110, while the recess 114 is empty and before the concrete lid 130 is secured in place, the tubes 134 are slipped or threaded over the upper ends of the cables 124 surrounding the recess 114 and all the cables 124 and 124' are then subjected to considerable tension by, for example, hydraulic jacks so as to extend them and prestress the material of vessel 110. The cables 124 surrounding the recess 114 are, however, only subjected to about ⅔ of the tension applied to the remainder of the cables 124'.

While the cables 124' are thus extended, they are secured to the upper surface 116 of the pressure vessel by cylindrical fastening members 136' whereas the fastening members 136 of the cables 124 surrounding the recess 114 abut the upper ends of the tubes 134. The concrete of the pressure vessel 110 is therefore maintained in compression by the cables 124' at all times.

When it is desired to secure the concrete lid 130 to the pressure vessel 110, the pod 112, with the steel lid 118 and the flange member 120 attached thereto, is lowered into the recess 114, the tubes 134 and fastening members 136 being slipped or threaded through the holes 126, until the underside of the flange member 120 rests on the flange member 123.

The concrete lid 130 is then lowered onto the steel lid 118, the tubes 134 and the fastening members 136 being slipped or threaded through the holes 132. At this point grout is pumped, as necessary, to the undersurface of the concrete lid 130, as hereinbefore described.

Additional tension is then applied to the cables 124 by the hydraulic jacks, so as to further extend them to the same per unit length tension as the remainder of the cables 124' and while they are thus extended, the positions of the fastening members 136 are adjusted as necessary and the split collets 138 are inserted between the fastening members 136 and the upper surface of the concrete lid 130 so as to maintain the cables 124 in their extended condition. The tension in the cables 124 is thus transmited to the pressure vessel 110 via the concrete lid 130.

When it is desired to remove the concrete lid 130, the cables 124 are extended as hereinbefore described a sufficient amount to permit removal of the split collets 138, whereupon the concrete lid 130 may be lifted clear.

The length of the tubes 134 is chosen so that when the fastening members 136 abut their upper ends, the cables 124 are under about ⅔ of the maximum tension imparted to them by the hydraulic jacks. The concrete of the pressure vessel 110 surrounding the recess 114 is therefore still maintained in compression by the cables 124 when the concrete lid 130 is removed.

It will be appreciated that the holes 132 in the concrete lid 130 must be sufficiently large for the cylindrical fastening members 136 to pass therethrough, so the concrete lid 130 may be lifted clear once the split collets 138 are removed.

It will further be appreciated that materials other than concrete may be used to construct the pressure vessel 110, for example, cast iron.

What I claim is:

1. In combination: a pressure vessel made of a material which may be stressed, said pressure vessel having an opening in one of its external surfaces; a plurality of prestressing cables extending through the material of said vessel in a direction substantially perpendicular to said one surface for stressing said vessel, at least some of said cables being attached at one of their ends to an external surface of said vessel and being unsecured to the material of said vessel through which they extend; a removable closure member; means to secure the other ends of the said at least some of said prestressing cables to said closure member and apply tension to the said at least some of said prestressing cables so that said closure member is urged by said at least some prestressing cables into engagement with a portion of the external surface surrounding said opening to apply stress to said vessel; and means to maintain at least some of said tension at all times in said at least some prestressing cables when said closure member is being and is removed and to apply stress to said vessel whereby said at least some prestressing cables maintain integrity of said vessel.

2. The combination as claimed in claim 1 wherein said closure member is provided with apertures through which said at least some prestressing cables pass, said securing means for securing the at least some prestressing cables to said closure member being arranged to engage the closure member on its side remote from said vessel.

3. The combination as claimed in claim 1 wherein said means for transmitting and maintaining at least some tension in said at least some prestressing cables when said closure member is removed includes a plurality of tubular members, one for each of said at least some prestressing cables, each tubular member having one end arranged to abut said vessel surrounding the opening and the other end arranged to abut said securing means when said closure member is removed.

4. The combination as claimed in claim 3 in which tension in said at least some prestressing cables when said closure member is removed is maintained at about two-thirds the tension of said prestressing cables when said closure member is positioned over said opening.

5. The combination as claimed in claim 3 wherein the material of said pressure vessel is concrete.

6. The combination as claimed in claim 3 wherein said closure member is made of prestressed concrete.

7. The combination as claimed in claim 3 wherein said prestressing cables are made from steel.

References Cited
UNITED STATES PATENTS

| | | | |
|---|---|---|---|
| 1,258,839 | 3/1918 | Wheeler | 52—20 |
| 3,293,139 | 12/1966 | Bellier | 52—224 |
| 3,349,524 | 10/1967 | Fistedis | 52—224 X |
| 3,353,859 | 11/1967 | Schupack | 52—224 |
| 3,390,211 | 6/1968 | Ziegler | 52—224 |
| 3,445,971 | 5/1969 | Desmarchais et al. | 52—80 |

FOREIGN PATENTS

| | | | |
|---|---|---|---|
| 1,428,553 | 1/1966 | France | 52—224 |
| 572,667 | 2/1958 | Italy | 52—224 |

ALFRED C. PERHAM, Primary Examiner

U.S. Cl. X.R.

52—223; 220—55 R